W. F. HIESERMANN.
AUTOMOBILE EXTRACTOR.
APPLICATION FILED APR. 21, 1920.
1,410,918.
Patented Mar. 28, 1922.
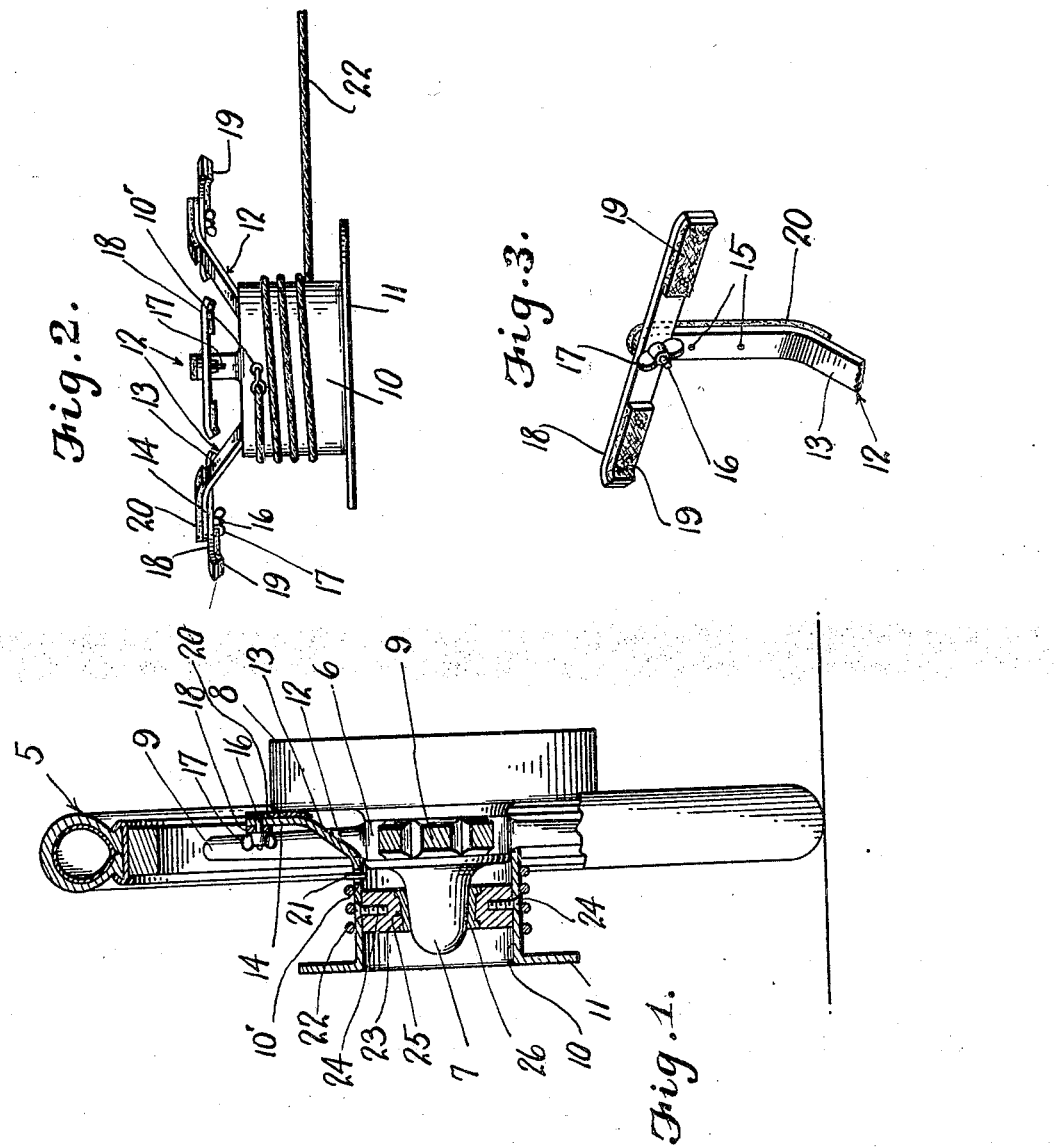
Inventor
W. F. Hiesermann
By J. S. Irving King
Attorney

UNITED STATES PATENT OFFICE.

WILLIAM F. HIESERMANN, OF IOWA PARK, TEXAS.

AUTOMOBILE EXTRACTOR.

1,410,918.  Specification of Letters Patent.  Patented Mar. 28, 1922.

Application filed April 21, 1920. Serial No. 375,526.

*To all whom it may concern:*

Be it known that WILLIAM F. HIESERMANN, a citizen of the United States, residing at Iowa Park, in the county of Wichita and State of Texas, has invented certain new and useful Improvements in Automobile Extractors, of which the following is a specification.

The present invention relates generally to automobile extractors and has reference more particularly to an appliance adapted for use on self-propelled vehicles, having for its principal object the provision of extremely simple means which facilitates the vehicle pulling itself free after its wheels have become embedded in a soft or muddy road or caught in a depression therein.

The primary object of the invention resides in the provision of a device of the above stated character, that is simple and inexpensive in construction, reliable, well adapted to withstand the usage to which automobile extractors are ordinarily subjected and calculated to lend itself to use on motor vehicles and any other applications.

The automobile extractor constructed in accordance with my invention is also, by reason of its characteristics, adapted to practically eliminate the undesirable difficulties heretofore experienced in the withdrawal or extraction of the vehicle from mud, sand or the like and one adapted to co-act with the driving wheels of the vehicle, so that the motor of the vehicle may be employed to accomplish the desired result.

The invention consists in the details of construction and in the combination and arrangement of the several parts of my improvement whereby certain important advantages are attained and the device rendered simpler, less expensive and otherwise more convenient and advantageous for use, and with the foregoing in mind, the invention consists in the peculiar construction, novel combination and adaptation of parts as hereinafter described and explicitly claimed.

Preceding a detail description of the invention reference is made to the accompanying drawings, of which:—

Figure 1 is an end view of one of the rear guide wheels partly in section.

Figure 2 is a plan view of the drum removed from the vehicle wheel and

Figure 3 is a detail perspective illustrating the manner of connecting the cross pieces with the arms of the drum.

Referring more particularly to the accompanying drawings, 5 denotes one of the rear or drive wheels of a motor driven vehicle, 6 the hub, 7 the hub cap, 8 the brake drum and 9 the spokes of such wheel.

The extractor which is designed for attachment to the wheel, as originally stated, and here illustrated as is the preferred embodiment, embodies a tubular drum 10, preferably constructed of metal, formed at its outer end with a flange 11. The opposite or inner end of the tubular drum 10, has formed integral therewith, at opposite diametric points, a series of resilient radially disposed arms 12, each including an inclined diverging portion 13 provided on the outer end thereof with a straight outer portion 14, the latter mentioned portion is provided with a series of superposed openings 15, the purpose of which will be clearly set forth as the description of the invention is proceeded with. The arms 12 have a tendency to spring in the direction of the flange 11.

Adjustably and pivotally connected with the straight vertical portion 14 of each arm 12, through the medium of a bolt 16, insertable in certain of the openings 15, and a thumb nut 17 mounted on said bolt, is the cross piece or head of the arms 18, having their opposite ends slightly bowed to facilitate a snug engagement thereof with certain pairs of the spokes 9, when the device is applied for use.

With an attempt to lending to the frictional contact or engagement of the cross piece 18 and the straight vertical portion 14, with the spokes and brake drum respectively, a lining 19 is secured to the opposing face of the cross piece at opposite sides of its pivot while 20 denotes a lining secured to the straight vertical portion 14.

The drum 10 is provided at a point adjacent its inner end with an opening 10' into which is inserted the hook 21, serving as a connection of the cable 22 with the drum.

I employ a cap engaging ring 23 mounted within the tubular drum 10, and of such diameter as to snugly engage with the inner periphery of said drum. The displacement of the ring 23 is prevented by a rigid connection of the latter within the drum, through the provision of diametrically disposed fastening members 24. This ring is centrally provided with an opening 25 which permits of the wheel cap 7 to project therethrough. The wall forming the opening 25 has secured thereto a lining 26 with which the cap frictionally engages upon the application of the extractor to one of the rear or drive wheels of the vehicle.

In operating the appliance, it is only necessary to fit the drum upon the hub of either drive wheel, forcing the arms between certain of the spokes and rotating the pivoted cross pieces at right angles to the arms until the lining of the arms and cross pieces frictionally engage with the brake drums and spokes respectively, after which the thumb screws are tightened by the employment of a suitable tool. Owing to the resiliency of the arms the latter will force the cross piece to a firm gripping action with the spokes and further tightly bind the lining of the cap ring with the cap of the vehicle. After this operation the hook 21 of the cable is inserted in the opening of the brake drum and the free end thereof connected with a support. The engine is then started to impart motion to the wheel thus rotating the drum and winding the cable thereupon, the winding of the cable causes the vehicle to move in the direction of the support.

From the foregoing description, it is thought to be obvious that a draft appliance for motor driven vehicles constructed in accordance with my invention is particularly well adapted for use by reason of the construction and facility with which it may be assembled and operated, and it will be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

Having thus described the invention, what is claimed as new, is:

1. An attachment for the wheels of self-propelled vehicles, including a tubular drum adapted to be arranged over the hub of a wheel, a ring secured in the drum having a peripheral friction surface which is received over and in contacting engagement with the hub cap of the wheel, said drum having its inner edge provided with radially arranged angular resilient arms which are adapted to be arranged between certain of the spokes of the wheel, an adjustably arranged pivotally supported removable cross piece on each arm, and each of said cross pieces having an arched end provided with a friction surface for contacting engagement with the surfaces of the spokes of the wheel to the opposite sides of the respective arms.

2. An attachment for wheels of self-propelled vehicles, including a tubular drum which is designed to have secured thereon and wound therearound a pull cable and which drum is adapted to be arranged over the hub of a wheel and to receive the hub cap therein, a ring secured in the drum having an inner peripheral friction surface that is arranged over and in contacting engagement with the hub cap, said drum having its inner edge integrally formed with resilient radially disposed angularly inclined apertured arms which exert a tension in the direction of the drum, a pivot member passing through one of the apertures in each of the arms, a cross bar having a central opening receiving the pivot therethrough, binding means on the pivot for contacting the cross bar, each of said cross bars having rounded ends and friction surfaces thereon designed to contact with the inner faces of the hubs of the pair of spokes to the opposite sides of the respective arms and to be held in such engagement through the medium of the spring pressure exerted thereon by the resilient arms.

In testimony whereof I affix my signature.

WILLIAM F. HIESERMANN.